(12) United States Patent
Broussard

(10) Patent No.: US 9,003,932 B2
(45) Date of Patent: Apr. 14, 2015

(54) LOCKNUT WRENCH, LEVELING DEVICE AND SCREWDRIVER COMBINATION TOOL

(71) Applicant: Jerry Broussard, Jeanerette, LA (US)

(72) Inventor: Jerry Broussard, Jeanerette, LA (US)

( * ) Notice: Subject to any disclaimer, the term of this patent is extended or adjusted under 35 U.S.C. 154(b) by 229 days.

(21) Appl. No.: 13/631,875

(22) Filed: Sep. 29, 2012

(65) Prior Publication Data

US 2014/0090526 A1 Apr. 3, 2014

Related U.S. Application Data

(60) Provisional application No. 61/626,553, filed on Sep. 28, 2011.

(51) Int. Cl.
| | | |
|---|---|---|
| *B25F 1/02* | (2006.01) | |
| *B25B 23/16* | (2006.01) | |
| *B28B 13/02* | (2006.01) | |
| *B25B 13/48* | (2006.01) | |
| *B25B 15/00* | (2006.01) | |
| *H02G 3/08* | (2006.01) | |

(52) U.S. Cl.
CPC .............. *B28B 13/02* (2013.01); *B25B 13/48* (2013.01); *B25B 15/00* (2013.01); *B25F 1/02* (2013.01); *H02G 3/083* (2013.01)

(58) Field of Classification Search
CPC ........ B25B 13/02; B25B 13/04; B25B 13/08; B25B 13/48; B25B 13/50; B25B 15/00; B25F 1/00
USPC .............. 81/176.1, 176.15, 437; 7/138, 165
See application file for complete search history.

(56) References Cited

U.S. PATENT DOCUMENTS

| | | | | |
|---|---|---|---|---|
| 1,627,435 A | * | 5/1927 | Hooben | 81/176.1 |
| 2,383,573 A | * | 8/1945 | Tomsek | 81/436 |
| 2,575,779 A | * | 11/1951 | Young | 7/138 |
| 4,061,058 A | * | 12/1977 | Douglas | 81/176.15 |
| 4,125,913 A | * | 11/1978 | Lewis | 7/138 |
| 4,597,123 A | * | 7/1986 | Cobe, Jr. | 7/138 |
| 5,237,715 A | * | 8/1993 | Bane, III | 7/139 |
| 5,845,354 A | * | 12/1998 | Long et al. | 7/139 |
| D467,478 S | * | 12/2002 | Harewood | D8/26 |
| 6,745,648 B2 | * | 6/2004 | Stier | 81/119 |
| 6,779,424 B2 | * | 8/2004 | Schmidt | 81/176.15 |
| 7,000,506 B1 | * | 2/2006 | Steen | 81/125.1 |
| D666,883 S | * | 9/2012 | Howard et al. | D8/19 |
| 2006/0150783 A1 | * | 7/2006 | Thompson | 81/124.4 |

* cited by examiner

*Primary Examiner* — David B Thomas
(74) *Attorney, Agent, or Firm* — Norris & Norris

(57) ABSTRACT

A combination tool of the locknut wrench type, which includes a leveling device and a screwdriver blade on the opposite end. The locknut head and screwdriver ends may be interchanged depending on the size locknut wrench needed and the type of screwdriver needed.

20 Claims, 3 Drawing Sheets

LOCKNUT WRENCH, LEVELING DEVICE AND SCREWDRIVER COMBINATION TOOL

CROSS REFERENCE TO RELATED APPLICATION

This non-provisional patent application claims priority and the benefit under 35 U.S.C. §119(e) of the U.S. Provisional Application Ser. No. 61/626,553, entitled "Locknut Wrench, Leveling Device and Screwdriver Combination Tool," filed Sep. 28, 2011, all of which is herein incorporated by reference.

BACKGROUND OF THE INVENTION

1. Field of the Invention

The present invention is related to a wrench-type tool, and specifically to a wrench with a leveling device included for engaging locknuts and screws as employed with electrical connectors.

2. Description of the Related Art

Locknuts are typically screwed against the end of a conduit to hold it securely so as to provide an electrical ground. They commonly take the form of a collar having internal threads and may be constructed of various materials (e.g., metal, plastic) and come in a variety of shapes (e.g., hexagonal, square, round) and sizes.

Locknuts used in association with electrical conduit are typically annular metal rings. The locknut includes a threaded inner surface for engaging a complementary threaded outer surface on the electrical connector. A series of projections known as lugs, commonly six or eight, extend radially from the ring. Between the lugs are rounded openings or scallops.

Locknuts are used to secure of sections of electrical connectors within electrical junction boxes. A junction box thereby serves to join different runs of raceway or cable and provides space for the connection and branching of the enclosed conductors. The connectors are typically further secured by use of a screw.

A common method of attaching an electrical connector to a junction box includes using a locknut wrench to tighten the locknut and a screwdriver to tighten the screw in the electrical connector. Additionally, after the electrical connector is attached, a leveling device is needed to ensure the conduit is level.

Other patents add screwdrivers and a variety of tools, but they do not go far enough. The need exists for an efficient tool for tightening locknuts and screwing the electrical connector in place, and ensuring the conduit is level. By combining a screwdriver, a locknut wrench, and a leveling device in a variety of embodiments, it will allow the user to replace three tools with one.

OBJECTIVE OF THE INVENTION

The main objective of the invention is to provide a locknut wrench that has the ability to also be used as a screwdriver and a leveling device, thus allowing the user to use one tool instead of three, to properly secure an electrical connection to a junction box.

SUMMARY OF THE INVENTION

The invention for achieving the aforementioned objects is a locknut wrench capable of being used to tighten or loosen locknuts and screws, and ensure the conduit is level. The invention provides a wrench with a head, that can be used to tighten locknuts; a handle, which can be used as a leveling device and can be covered by a padding that provides insulation, cushion, and/or is absorbent; and an opposite end provides a screwdriver for aiding the user in the tightening the set screw.

DESCRIPTION OF THE PREFERRED EMBODIMENT

Embodiments of the present invention are now explained. Although the disclosure is sufficient to enable to those skilled in the art to practice the invention, the physical embodiments herein disclosed merely exemplify the invention, which may be embodied in other structures. While the preferred embodiment has been described, the details may be changed without departing from the invention, which is defined by the claims.

Figure 1:
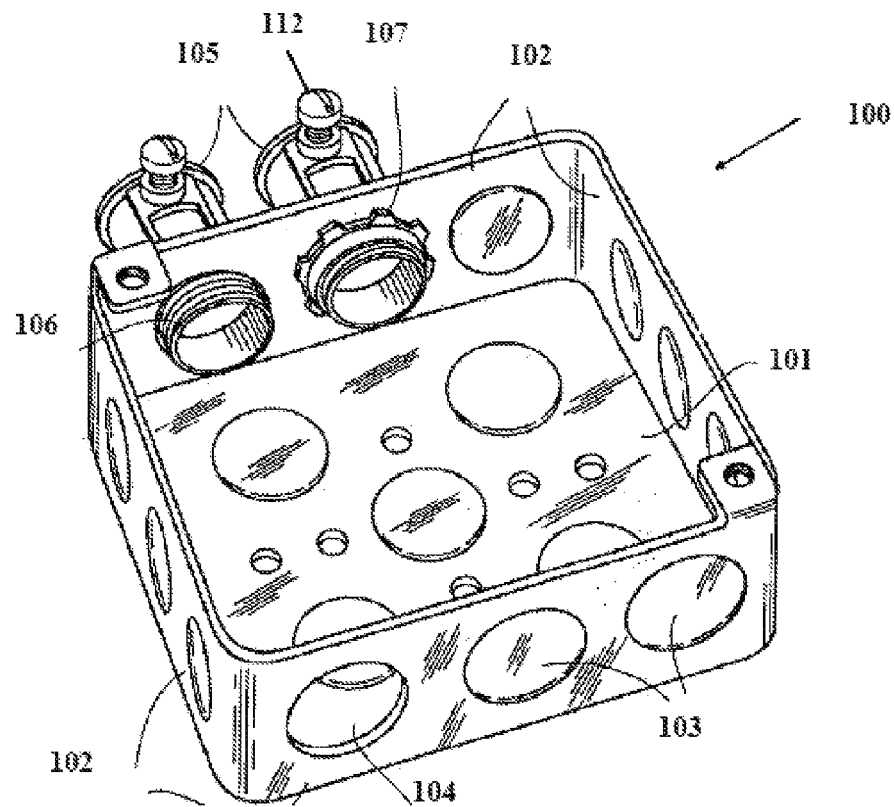
FIG. 1 is a view of a junction box with electrical connectors attached to it, with and without locknuts.

FIG. 1 shows a conventional electrical junction box 100 having a bottom wall 101 and four side Walls 102. The box 100 includes a series of scored knock-out sections 103 that are well known in the art. Removal of a knock-out 103, e.g., by striking the section with a hammer, results in an opening 104 that permits passage of an electrical connector 105.

Conventional connectors 105 include a threaded end region 106 sized and configured for passage through the opening 104. Connectors 105 are available in a variety of sizes. The connector 105 is typically secured within the junction box 100 by a locknut 107.

Figure 2:
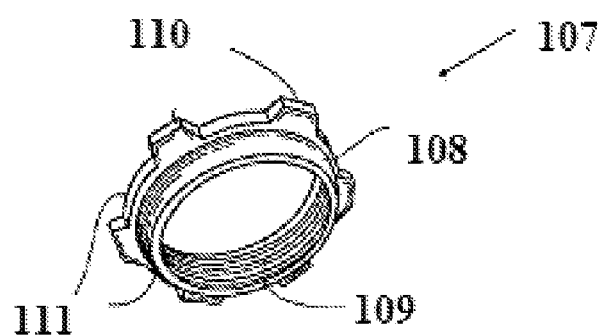
FIG. 2 is a view of a locknut.

FIG. 2 shows a conventional locknut used 107 for electrical connectors is typically an annular metal ring 108 having a threaded inner surface 109 sized and, configured to mate with the threaded end region 106 of the connector 105 within the junction box 100. Extending from the outer periphery of the ring is a series of projections, or lugs 110. The areas between adjacent lugs define a series of rounded openings, or scallops 111. Locknuts 107 employed with electrical connectors 105 typically have either six lugs 110 or eight lugs 110 and come in a range of various sizes to accommodate the various sizes of connectors 105.

Figure 3:
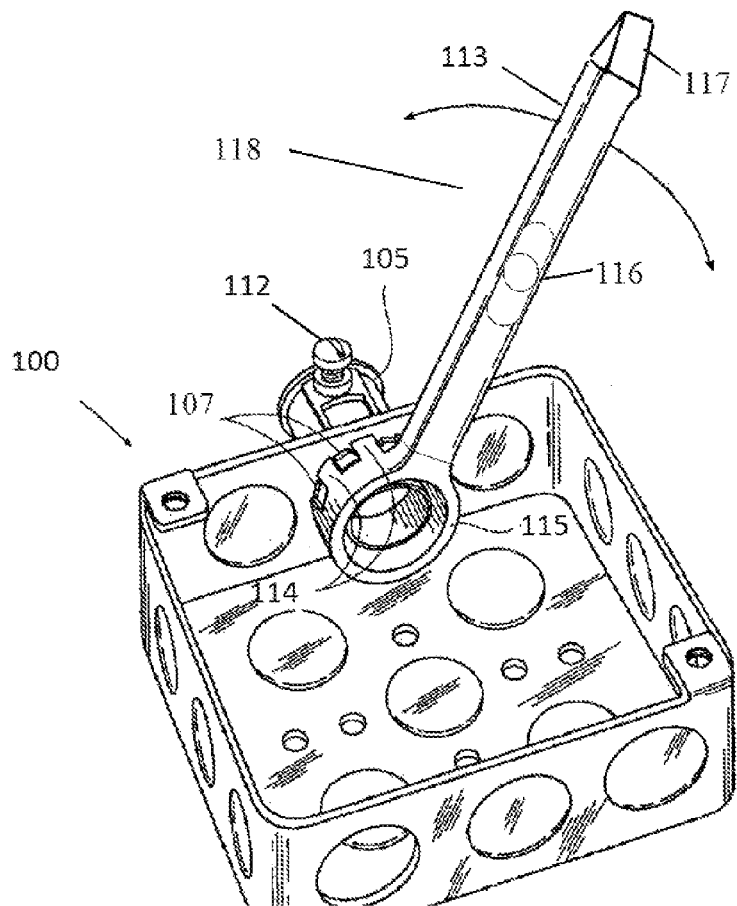
FIG. 3 is a perspective view of the tool engaging a locknut, which is being used to secure an electrical connector, on a junction box.

FIG. 3 shows a wrench tool 118 for engaging both a locknut 107 and screw 112. The tool 118 is particularly well suited for engaging a locknut 107 such as that used to secure an electrical connector 105, and thus will be described in accordance with such use. However, uses of the tool 118 to engage and secure other fittings are contemplated and will be apparent to those skilled in the art that read this disclosure.

The tool 118 having a head 115 that is complementary to the locknut 107 is then positioned to engage the locknut 107. The handle 113 is then manipulated to rotate the locknut 107 in a first direction to tighten the locknut 107. The locknut 107 may then be rotated in the opposite direction to loosen and remove the locknut 107.

Figure 4:
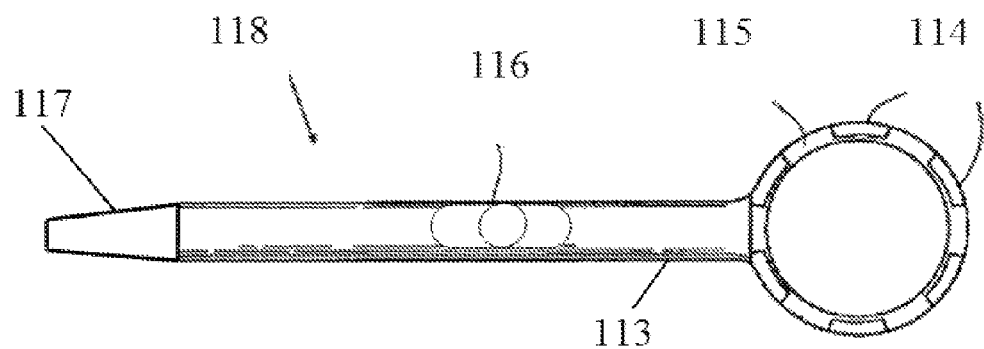
FIG. 4 is a perspective view of the locknut wrench with a screwdriver attached to the opposite end.

FIG. 4 illustrates an embodiment of the tool 118 in which the head 115 includes six tangs 114, configured to engage a locknut 107 having six lugs 110, the opposite end includes a flathead screwdriver 117 configured to engage a similar screw 112, and the handle 113 includes a leveling device 116. The tool 118 may be made of steel, a combination of steel and plastic, or other suitable materials and formed by mold, die, or machining. The head 115 may be interchanged for heads 115 of different types and sizes (six tangs, eight tangs; ½ inch, 1 inch, etc.), and the screwdriver 117 may be interchanged for different types (e.g. flathead, Phillips, etc.).

Figure 5:
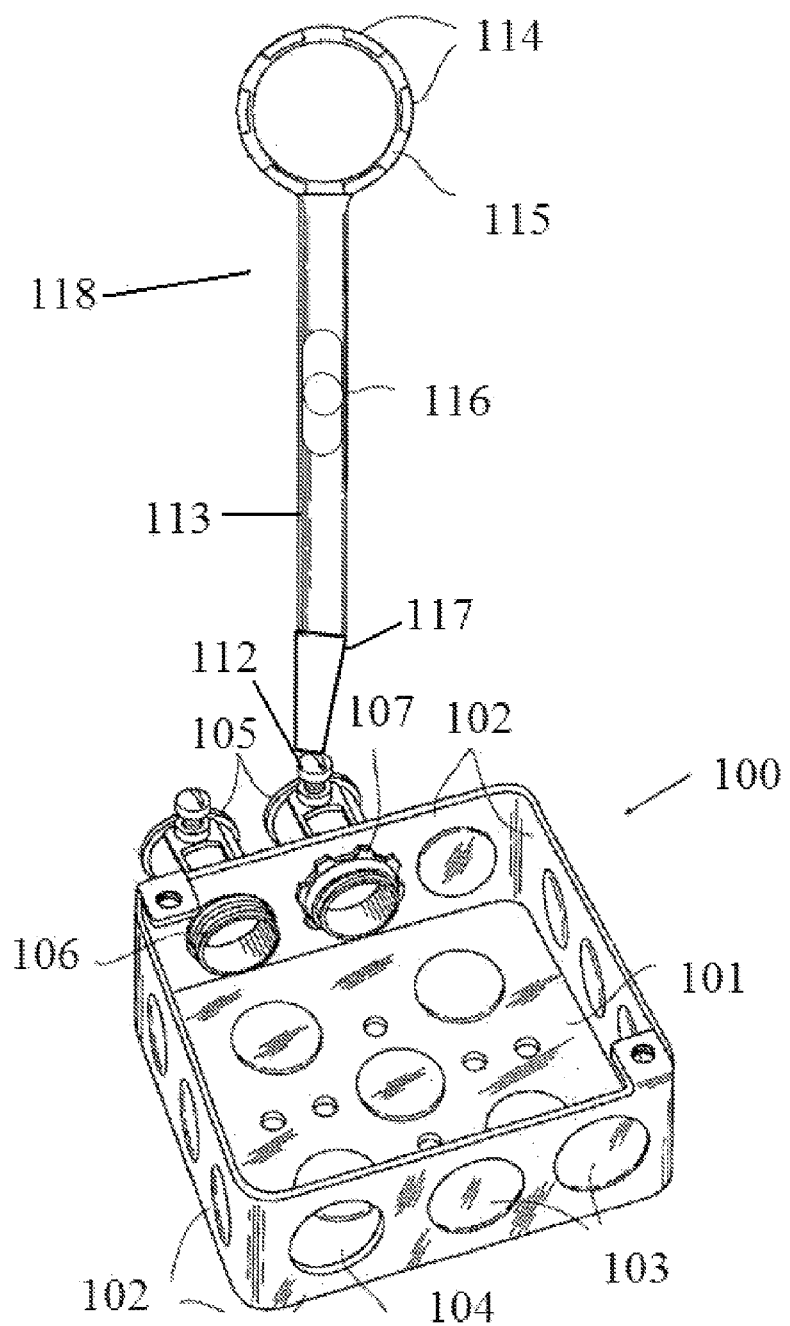
FIG. 5 is a perspective view of the tool engaging a set screw, which is being used to secure an electrical connector, on a junction box.

FIG. 5 shows a wrench tool 118 engaging a set screw 112. The tool 118 having an end 117 that is complementary to a screw 112 is then positioned to engage the screw 112. The handle 113 is then manipulated to rotate the locknut 107 in a first direction to tighten the screw 112. The screw 112 may then be rotated in the opposite direction to loosen and remove the screw 112.

What is claimed:

1. A tool for engaging a nut and screw, the nut configured for engaging an abutting surface and having at least one laterally-extending projection, the tool comprising:
   a handle;
   a plurality of heads connected to a handle, at least one head of said plurality of heads comprising a wrench, said wrench having a plurality of upstanding axially projecting tangs for alternatively engaging opposing sides of the projection, and
   at least one head of said plurality of heads comprising a screwdriver for alternatively engaging screws.

2. The tool according to claim 1, in which the handle comprises a leveling device.

3. The tool according to claim 2, in which at least one of the said plurality of heads connected to said handle are interchangeable with other heads, forming other tool types and able to engage different locknut and screw sizes, wherein the wrench is able to be rotated at an angle.

4. The tool according to claim 3, in which the screwdriver is able to be rotated at an angle.

5. The tool according to claim 4, in which the wrench is able to engage a locknut.

6. The tool according to claim 5, in which the screwdriver is a slotted (i.e. flathead) type screwdriver.

7. The tool according to claim 6, in which the screwdriver is a hexalobular internal (i.e. star) type screwdriver.

8. The tool according to claim 7, in which said handle covered by an insulating cushion material.

9. The tool according to claim 8, in which said handle is also covered by an absorbent material.

10. The tool according to claim 5, in which the screwdriver is a cross (i.e. Phillips) type screwdriver.

11. A tool for engaging a nut and screw, the nut configured for engaging an abutting surface and having at least one laterally-extending projection, the tool comprising:
    a screwdriver type handle;
    a plurality of heads connected to the handle, at least one head of said plurality of heads comprising a wrench, said wrench having a plurality of upstanding axially projecting tangs for alternatively engaging opposing sides of the projection, and
    at least one head of said plurality of heads connected to the handle having a screwdriver for alternatively engaging screws.

12. The tool as in claim 11, wherein the handle has a leveling device included.

13. The tool according to claim 12, in which at least one of the said plurality of heads connected to said handle are interchangeable with other heads, forming other tool types and able to engage different locknut and screw sizes, wherein the wrench is able to be rotated at an angle.

14. The tool according to claim 13, in which the screwdriver is able to be rotated at an angle.

15. The tool according to claim 14, in which the wrench is able to engage a locknut.

16. The tool according to claim 15, in which the screwdriver is a slotted (i.e. flathead) type screwdriver.

17. The tool according to claim 16, in which the screwdriver is a cross (i.e. Phillips) type screwdriver.

18. The tool according to claim 17, in which the screwdriver is a hexalobular internal (i.e. star) type screwdriver.

19. The tool according to claim 18, in which said handle covered by an insulating cushion material.

20. The tool according to claim 19, in which said handle is also covered by an absorbent material.

\* \* \* \* \*